Figure 1:
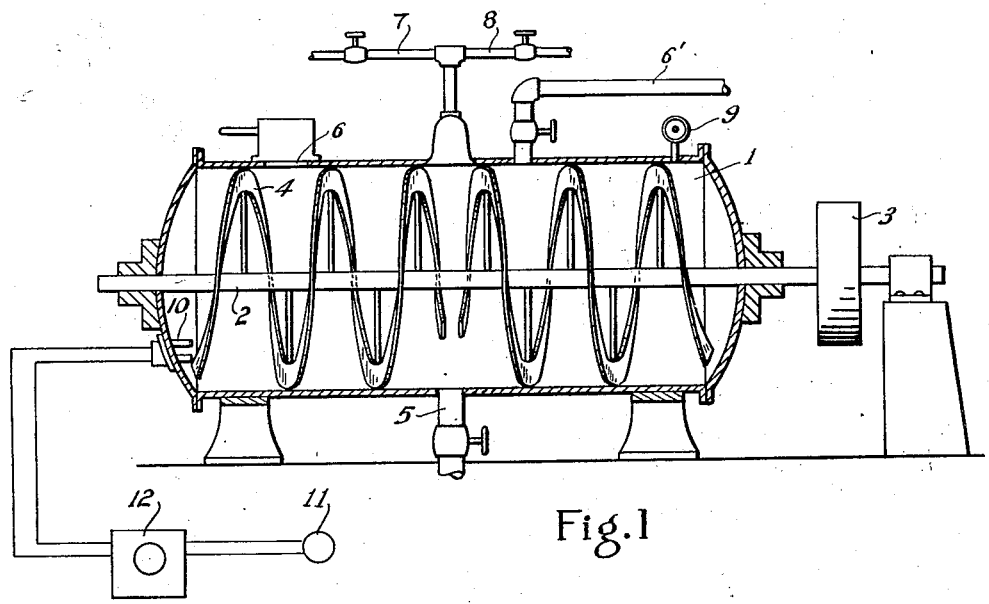

Sept. 24, 1940.   G. M. THOMSON ET AL   2,215,891
METHOD OF PRODUCING HYDRATED CALCIUM SILICATE
MINERALS AND PRODUCTS THEREOF
Filed Nov. 12, 1938

INVENTORS:
GEORGE M. THOMSON and ZOLTAN ERDELEY
BY Alex. E. MacRae
ATTORNEY.

Patented Sept. 24, 1940

2,215,891

UNITED STATES PATENT OFFICE 2,215,891

METHOD OF PRODUCING HYDRATED CALCIUM SILICATE MINERALS AND PRODUCTS THEREOF

George Miller Thomson, Caledonia, Ontario, and Zoltan Erdeley, Brantford, Ontario, Canada, assignors to Gypsum, Lime and Alabastine, Canada, Limited, Paris, Ontario, Canada Application November 12, 1938, Serial No. 240,000

9 Claims. (Cl. 106—24)

This invention relates to the production of hydrated calcium silicates and light weight and other products thereof.

It is well known that sand of high silicate content can be bonded into hard masses by mixing with it small amounts of hydrated lime and enough water to provide a damp mixture which is subjected to a pressure of about 2000 lbs. per square inch and then indurated under a steam pressure of 120 lbs. per square inch for a period of eight hours. In the Komnick process, which has been used for many years, the damp mixture is heated for about 20 minutes at about 50 lbs. steam pressure, in a mixing drum revolving on a horizontal axis, prior to compression and subsequent induration. The product of such a process has a density of about 129 lbs. per cubic foot and a compressive strength of about 6000 lbs. per square inch.

Many attempts have been made to produce durable light weight materials, utilizing this lime-silica reaction, but insofar as applicants are aware no commercial method has heretofore been available or known for producing such products of uniform density or compressive strength.

The object of the present invention is to provide light weight durable materials of desired density and compressive strength and a method whereby such products may be synthetically produced in line production and in any desired structural form. The invention also contemplates the production of synthetic hydrated calcium silicate in other than structural forms.

It is well known that there is a substantial number of hydrated calcium silicates containing varying proportions of lime, silica and water. After prolonged and intensive research, applicants have developed a method whereby some of such minerals can be produced synthetically and commercially in structural and other forms of a porous character, containing innumerable submicroscopic pores throughout the mass. The pores or void spaces may represent as much as 90% of the total volume of the mass in the lightest weight products, and the pore sizes afford very low heat conductivity.

The silica employed is uniformly ground and at least 90% should pass through 200 mesh screen. The finer the particles of silica the faster the reaction. High calcium type lime with a low percentage of impurities is used. It should be crushed to pass a 1½" screen opening. It is hydrated in an excess of water, preferably 5 to 6 parts of water to 1 of lime, and at a temperature, preferably not less than 200° F. to insure very fine particles of hydrated lime. As hot water has a very low capacity for dissolved lime, and as silica combines rapidly with dissolved lime at high temperatures, very fine lime particles are necessary for quick dissolving to replace that extracted by the silica, so that any degree of concentration may be maintained. The lime should be hydrated in large quantities and thoroughly mixed beforehand. If uniformity is maintained for both silica and hydrated lime, identical results are obtained under uniform operating conditions of temperature, pressure, and the like.

The method for producing structural materials includes three stages in each of which the concentration of lime in the solution surrounding the reacting silica particles is closely controlled. In the first stage a soft gel type hydrated calcium silicate is formed. In the second stage a crystalline hydrated calcium silicate is formed and in the third stage the material is changed to a hard gel type or amorphous hydrated calcium silicate, which is believed to be gyrolite, 2CaO.3SiO$_2$.2H$_2$O, in structural form.

Figure 2:
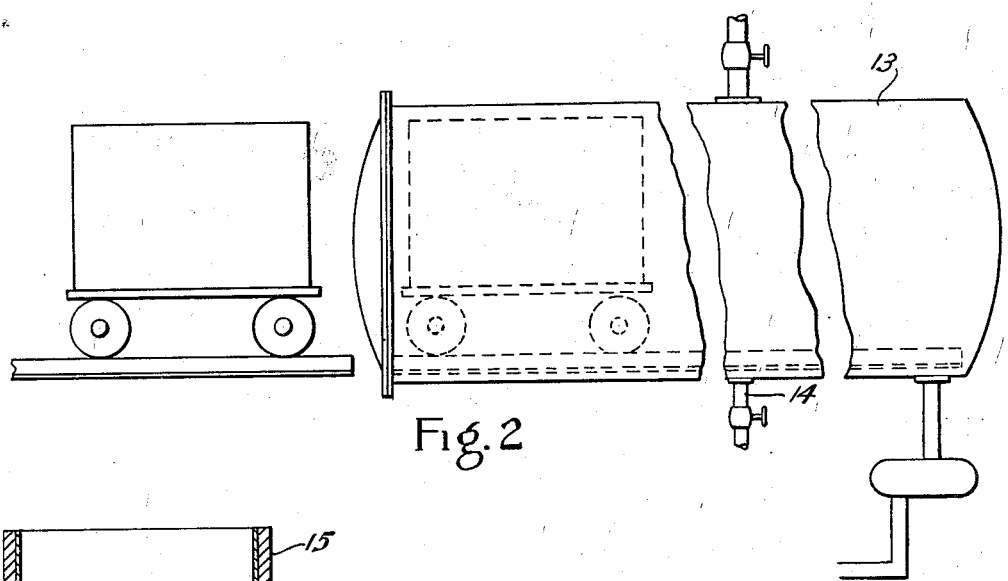
Figure 3:
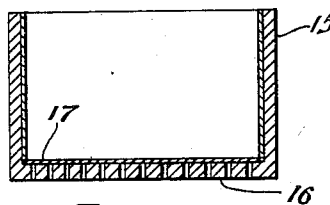

A form of apparatus for carrying out the method is more or less diagrammatically illustrated in the accompanying drawing in which Figure 1 is the crystal generator with the lime concentration measuring device, Figure 2 is the indurating autoclave and Figure 3 is a mold with drainage facilities.

A generator tank 1 is provided with a central shaft 2 driven from a pulley 3 and carrying agitating or stirring means, represented by a metal ribbon 4 arranged to direct material to a bottom discharge 5. 6 represents a main charging port and 6' an inlet for lime. 7 is a steam inlet, 8 a steam exhaust outlet and 9 a steam pressure guage. The device for measuring lime concentration of the solution consists of an electrode 10 having two poles, preferably of platinum, immersed in the solution in the generator and connected to a constant source 11 of alternating electric current with a meter 12 in the circuit. The meter may indicate the current flow in milliamperes or the resistance to current flow in ohms. Such instruments are commercially available. Alternating current is used to prevent coating of the electrodes.

The indurating device consists of the autoclave 13 of the type commonly used for making sand lime brick and has a track for receiving cars carrying the molds, a removable pressure tight door, a steam supply pipe and a trap for condensation. It may be provided with a bleeding line 14 adapted to permit inflow of air to prevent formation of vacuum during the pressure reduction period.

The mold 15 is provided with a perforated bottom 16 for drainage purposes and a detachable liner 17 capable of acting as a filter to release the solution.

In operation the generator is preferably first heated to about the boiling point of water. The concentration measurement device is adjusted to place. The generator is charged with the finely divided silica and a hot aqueous lime solution having a concentration of not more than 99% nor less than 81% of saturation. It is essential to maintain the lime concentration within the limits stated during this stage of the operation. The preferred operating range is 90 to 95% of saturation. In order that the silica may remain freely suspended under the influence of the agitator, sufficient water should be present, in the proportion of, say, three pounds of water per pound of silica. The temperature within the generator is raised to the desired point, say 338° F., the equivalent of 100 lb. steam pressure, by the admission of steam or by other heating means. The lime combines with silica and to maintain the required concentration lime is fed into the solution in the generator at a slowly accelerating rate as the temperature rises. A soft gel type hydrated silicate is formed during this stage. It is important to avoid the presence of excessive amounts of undissolved lime as it causes flocculation with silica particles, which removes appreciable portions of the lime and silica from the action of the surrounding lime solution. By reading the measuring instrument the rate of feeding lime is readily controlled to maintain the required concentration of lime. Not more than two-thirds of the silica is caused to combine with lime in this soft gel forming period. The end mineral after induration, to be later described, being gyrolite (2CaO.3SiO₂.2H₂O) the theoretical proportion of lime and silica is .622 lime to 1 of silica by weight. Slightly more than half of the calculated amount of lime is added during this stage.

The lime concentration of the solution is now raised to and maintained at 100% of saturation, as indicated by the measuring instrument, by introducing the rest of the lime. At this concentration hydrated calcium silicate crystals form and grow. Some of these crystals are detached, some attached and emanating from minute silica remnants and appearing under the microscope as burr-like clusters, and others emanating as spikes from certain faces of silica particles. It may be observed that these burr-like clusters act as fenders to prevent close packing of the crystals in their disordered relationship in the mass. The temperature is maintained until there is a pronounced drop in the concentration as indicated by the instrument. The crystal growing period is then complete and the heating is discontinued before the concentration is allowed to drop below 95% of saturation and preferably earlier.

The material is then drained to remove the lime water. This may be accomplished in a drainage or settling tank or by discharging the mass directly into molds provided with drainage facilities as described. The charged molds are run into the indurating autoclave and the material is consolidated into structural form by maintenance of a live steam pressure of say, 120 pounds for a period of, for example, 5 to 8 hours or longer.

The indurated product thus formed has high and uniform compressive strength and the lightest weight material, about 12 lbs. per cubic foot, consists practically entirely of gyrolite interspersed with minute intercommunicating pores, while as the weight per cubic foot increases the proportion of uncombined silica increases and the gyrolite decreases. In the heavy material, say 55 lbs. per cubic foot, while the proportion of gyrolite is much less, it is still sufficient to provide the structural bond for the fine silica particles.

The pore sizes of the material can be reduced and the heat conductivity of the material decreased by adding hydrated lime to the crystalline product of the generator before indurating. The pore sizes decrease inversely with such additions of hydrated lime but it is essential that the total lime content of the finished product does not exceed that which can combine with silica to form gyrolite.

When unconsolidated small particles of gyrolite are required rather than the shaped structural products, the formation of the soft gel type silicate is continued as previously described until all of the lime has been fed to the generator. As the heating is continued the lime concentration drops below 81% of saturation, and fine unconsolidated particles of gyrolite are formed.

This application is a continuation in part of application Serial Number 97,410 filed August 22, 1936.

We claim:

1. In the production of hydrated calcium silicates, the method which comprises suspending finely divided silica in a lime solution, which is about 90% saturated, under steam pressure and while maintaining said pressure adding lime to maintain substantially that degree of lime concentration in said solution.

2. In the production of hydrated calcium silicate products, the method which comprises suspending finely divided silica in a solution of lime under steam pressure; adding lime to maintain a predetermined lime concentration in said solution while forming one type of said silicate, thereafter adding lime to maintain a different predetermined lime concentration in said solution to form another type of said silicate and maintaining the reacting mass under steam pressure throughout the reaction period.

3. A method as set forth in claim 2 wherein the silicate formed is drained and molded and the molded product is hardened under steam pressure.

4. A method of making light weight structural materials which comprises suspending fine silica particles in a lime solution, while heating the mass adding lime to maintain the lime solution at a concentration not less than 81% nor more than 99% of saturation to form a soft gel type of silicate, raising the lime concentration to saturation to grow silicate crystals, draining the mass and indurating the same under steam pressure to harden the material.

5. A method of making light weight insulating blocks, comprising the steps of finely pulverizing silica material, hydrating high calcium lime in an excess of water, suspending silica particles in lime solution in a heated zone, adding thereto lime to produce and maintain a lime concentration not less than 81 nor more than 90% saturation while forming a soft gel type of silicate, raising the lime concentration to saturation to grow silicate crystals, draining and shaping the mass and hardening the shapes under steam pressure.

6. A method of making light weight structural materials consisting essentially of hydrated calcium silicate, including the steps of finely pulverizing silica material, hydrating lime in an excess of water, measuring the lime and the silica to be combined, the proportion of lime being not more than .622 lb. per pound of silica, suspending the silica in lime solution, heating the mass, adding thereto more than 50% of the lime while maintaining the lime concentration of the solution at about 90% of saturation to form a soft gel type silicate, adding the balance of the lime while maintaining the solution saturated to form crystals, draining and shaping the mass and hardening the shapes under steam pressure.

7. A method as set forth in claim 6 wherein after the crystal growing period and before shaping, lime is incorporated in the mass to reduce the size of the pores in the finished product.

8. A method as set forth in claim 4 wherein the lime does not exceed .622 pound per pound of silica and in excess of 50% of the lime is added prior to the crystal growing period.

9. A three stage method for making hydrated silicate products from finely divided silica suspended in a solution of lime under steam pressure, comprising a soft gel forming stage in which the lime concentration of the solution is maintained at 90 to 95% of saturation, a crystal forming stage in which the lime concentration of the solution is maintained at saturation and an indurating stage in which the crystal containing molded mass from which the lime solution has been drained is heated under steam pressure.

GEORGE MILLER THOMSON.
ZOLTAN ERDELEY.

CERTIFICATE OF CORRECTION.

Patent No. 2,215,891. September 24, 1940.
GEORGE MILLER THOMSON, ET AL.

It is hereby certified that error appears in the printed specification of the above numbered patent requiring correction as follows: Page 2, second column, line 70, claim 5, for "90%" read --99%--; and that the said Letters Patent should be read with this correction therein that the same may conform to the record of the case in the Patent Office.

Signed and sealed this 12th day of November, A. D. 1940.

(Seal)

Henry Van Arsdale,
Acting Commissioner of Patents.